US006477449B1

(12) United States Patent
Conner et al.

(10) Patent No.: US 6,477,449 B1
(45) Date of Patent: Nov. 5, 2002

(54) METHODS, APPARATUS AND COMPUTER PROGRAM PRODUCTS FOR DETERMINING A CORRECTED DISTANCE BETWEEN AN AIRCRAFT AND A SELECTED RUNWAY

(75) Inventors: Kevin J Conner, Kent; Steven C. Johnson, Issaquah, both of WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/495,630

(22) Filed: Feb. 1, 2000

Related U.S. Application Data

(63) Continuation of application No. 60/118,222, filed on Feb. 1, 1999.

(51) Int. Cl.[7] .................................................. G06F 7/00

(52) U.S. Cl. ............................ 701/4; 701/16; 701/205; 340/945; 340/972

(58) Field of Search ............................... 701/4, 16, 17, 701/18, 205, 300, 302; 340/945, 963, 972, 976; 342/32, 33; 244/183, 186

(56) References Cited

U.S. PATENT DOCUMENTS

| | | | | |
|---|---|---|---|---|
| 3,715,718 A | | 2/1973 | Astengo | 340/970 |
| 3,786,505 A | * | 1/1974 | Rennie | 342/33 |
| 3,925,751 A | | 12/1975 | Bateman et al. | 340/967 |

(List continued on next page.)

FOREIGN PATENT DOCUMENTS

| | | | |
|---|---|---|---|
| CA | 1033828 | 6/1978 | 343/15 |
| DE | 4304561 A | 8/1994 | B34D/45/04 |
| DE | 4327706 A1 | 2/1995 | G08G/5/04 |

(List continued on next page.)

OTHER PUBLICATIONS

Baldwin et al. "GPS–Based Terrain Avoidance System—A Solution for General Aviation Controlled Flight into Terrain," *Rannoch Corporation*, (date unknown).

(List continued on next page.)

*Primary Examiner*—William A. Cuchlinski, Jr.
*Assistant Examiner*—Edward J. Pipala

(57) ABSTRACT

The present invention provides several apparatus, methods, and computer program products for determining a corrected distance between an aircraft and selected runway, such that the corrected distance may be used for ground proximity warning calculations. Specifically, the present invention includes a processor that receives data related to the coordinates of the aircraft and a selected runway. Based on these coordinate values, the processor determines a coordinate distance between the aircraft and selected runway. The processor also compares the altitude of the aircraft to a predetermined glideslope constructed about the runway. Specifically, the processor calculates a distance value that corresponds to the altitude of the aircraft above the runway along the predetermined glideslope. The processor compares the coordinate distance and the calculated distance values and selects either the coordinate distance or the calculated distance value as the corrected distance between the aircraft and the selected runway. For instance, in one embodiment, the processor compares the coordinate and calculated distance values and selects the larger of the values as the corrected distance between the aircraft and the selected runway. The present invention also provides a processor for determining a look ahead distance value for ground proximity warning calculations. The processor of this embodiment, initially determines differing look ahead distance values based on the corrected distance to the runway, ground speed of the aircraft, and the actual roll angle of the aircraft. The processor compares the three look ahead distance values and selects the smallest of the look ahead distance values for use in the ground proximity warning system.

24 Claims, 10 Drawing Sheets

U.S. PATENT DOCUMENTS

| | | | | | |
|---|---|---|---|---|---|
| 3,934,221 | A | | 1/1976 | Bateman et al. | 340/970 |
| 3,934,222 | A | | 1/1976 | Bateman et al. | 340/970 |
| 3,936,796 | A | | 2/1976 | Bateman et al. | 340/970 |
| 3,944,968 | A | | 3/1976 | Bateman et al. | 340/970 |
| 3,947,808 | A | | 3/1976 | Bateman | 340/970 |
| 3,947,810 | A | | 3/1976 | Bateman et al. | 340/970 |
| 3,958,218 | A | | 5/1976 | Bateman | 340/970 |
| 3,958,219 | A | | 5/1976 | Bateman | 340/970 |
| 4,030,065 | A | | 6/1977 | Bateman | 340/970 |
| 4,060,793 | A | | 11/1977 | Bateman | 340/970 |
| 4,063,073 | A | | 12/1977 | Strayer | 364/439 |
| 4,215,334 | A | | 7/1980 | Bateman | 340/970 |
| 4,224,669 | A | | 9/1980 | Brame | 364/433 |
| 4,316,252 | A | * | 2/1982 | Cooper | 701/6 |
| 4,319,218 | A | | 3/1982 | Bateman | 340/970 |
| 4,454,510 | A | * | 6/1984 | Crow | 342/33 |
| 4,484,192 | A | | 11/1984 | Seitz et al. | 340/995 |
| 4,567,483 | A | | 1/1986 | Bateman et al. | 340/970 |
| 4,642,775 | A | | 2/1987 | Cline et al. | 364/443 |
| 4,646,244 | A | | 2/1987 | Bateman et al. | 364/461 |
| 4,675,823 | A | | 6/1987 | Noland | 364/460 |
| 4,835,537 | A | | 5/1989 | Manion | 340/961 |
| 4,894,655 | A | | 1/1990 | Joguet et al. | 340/988 |
| 4,903,212 | A | | 2/1990 | Yokouchi et al. | 364/449.95 |
| 4,912,645 | A | | 3/1990 | Kakihara et al. | 364/449.2 |
| 4,914,436 | A | | 4/1990 | Bateman et al. | 340/970 |
| 4,914,733 | A | | 4/1990 | Gralnick | 340/961 |
| 4,916,448 | A | | 4/1990 | Thor | 340/970 |
| 4,924,401 | A | | 5/1990 | Bice et al. | 364/424.015 |
| 4,947,164 | A | | 8/1990 | Bateman | 340/968 |
| 4,954,959 | A | | 9/1990 | Moroto et al. | 364/449.5 |
| 4,987,413 | A | | 1/1991 | Grove | 340/970 |
| 5,086,396 | A | | 2/1992 | Waruszewski, Jr. | 364/454 |
| 5,136,512 | A | | 8/1992 | Le Borne | 364/461 |
| 5,140,532 | A | | 8/1992 | Beckwith, Jr. et al. | 395/101 |
| 5,153,588 | A | | 10/1992 | Muller | 340/968 |
| 5,155,688 | A | | 10/1992 | Tanaka et al. | 364/454 |
| 5,157,615 | A | | 10/1992 | Brodegard | 364/461 |
| 5,196,847 | A | | 3/1993 | Bateman | 340/970 |
| 5,202,690 | A | | 4/1993 | Frederick | 342/26 |
| 5,220,322 | A | | 6/1993 | Bateman et al. | 370/970 |
| 5,252,978 | A | | 10/1993 | Priestley | 342/29 |
| 5,257,195 | A | | 10/1993 | Hirata | 364/449.95 |
| 5,265,025 | A | | 11/1993 | Hirata | 364/449.7 |
| 5,285,391 | A | | 2/1994 | Smith, Jr. et al. | 364/443 |
| 5,293,163 | A | | 3/1994 | Kakihara et al. | 340/995 |
| 5,293,318 | A | | 3/1994 | Fukushima | 364/449.95 |
| 5,337,242 | A | | 8/1994 | Yasmamoto et al. | 364/449.2 |
| 5,414,631 | A | | 5/1995 | Denoize et al. | 364/461 |
| 5,442,556 | A | | 8/1995 | Boyes et al. | 364/461 |
| 5,486,821 | A | | 1/1996 | Stevens et al. | 340/970 |
| 5,488,563 | A | | 1/1996 | Chazelle et al. | 364/461 |
| 5,495,249 | A | | 2/1996 | Chazelle et al. | 346/36 |
| 5,519,392 | A | | 5/1996 | Oder et al. | 340/995 |
| 5,526,000 | A | | 6/1996 | Chazelle et al. | 342/407 |
| 5,581,259 | A | | 12/1996 | Schipper | 342/451 |
| 5,608,392 | A | | 3/1997 | Faivre el al. | 340/967 |
| 5,638,282 | A | | 6/1997 | Chazelle et al. | 364/461 |
| 5,661,486 | A | | 8/1997 | Faivre et al. | 342/33 |
| 5,677,842 | A | | 10/1997 | Denoize et al. | 364/461 |
| 5,745,054 | A | * | 4/1998 | Wilkens | 340/972 |
| 5,798,712 | A | | 8/1998 | Coquin | 340/970 |

FOREIGN PATENT DOCUMENTS

| | | | | |
|---|---|---|---|---|
| EP | 0790487 A2 | 8/1987 | G01C/23/00 |
| FR | 2689668 | 10/1993 | G08G/5/04 |
| FR | 2721130 | 12/1995 | G08G/5/04 |
| GB | 2 266 286 A | 10/1993 | B64D/45/04 |
| WO | WO 85/03566 | 8/1985 | G01C/5/00 |

OTHER PUBLICATIONS

Bateman, "How to Terrain–proof the World's Airline Fleet," *Sundstrand Data Control. Flight Safety Foundation*, 44$^{th}$ IASS, Singapore, 1991.

Bennett and Cockburn, "Pilot Monitoring of Display Enhancements Generated From A Digital Data Base," *AGARD Conference Proceedings No, 456*, 1990.

Bennett, "The Use of Digital Map Data to Provide Enhanced Navigation and Displays for Poor Weather Penetration and Recovery," *GEC Marconi Avionics*, 1993.

Bice, "Development of an Automated Ground Collision Avoidance System Using A Digital Terrian Database," *Wright Patterson AFB*, 1989.

DiPadua et al., "Comparison of the General Dynamics Ground Clobber Algorithm with the GCAS and Laws Algorithms," *Crew Station Design Facility, Wright Patterson AFB*, 1988.

Fitzgerald and Brunner, "Use of High–Fidelity Simulation in the Development of an F/A–18 Active Ground Collision Avoidance System," *SAE International*, 1992.

Fitzsimmons, "First moves towards an "intelligent" GPWS," *Interavia/Aerospace World*, 1993.

Grey and Dale, "Advances in Techniques and Technologies for Air Vehicle Navigation and Guidance," *NATO Advisory Group for Aerospace Research and Development* (*AGARD*), Guidance and Control Panel 48$^{th}$ Symposium, 1989.

Hewitt, "The Use of Terrian Database for Avionic Systems, "*The Institution of Electrical Engineers*, 1995.

Hopkins et al., "Quo Vadis?," *Flight International 11–17*:37–40, Mar. 1992.

"GCAS—Past, Present and Future of Alert Systems for Abnormal Closure to Ground," *Abstract*, 1993, translation by Kei Kino, (Japanese Article with English Translation).

Kuchar and Hansman, Jr., "Part–Task Simulator Evaluations of Advance Terrain Display," Preprints, SAE Aerotech Conference and Exposition, Anaheim, CA, 1993.

Lawrence, "Modern Inertial Technology," Springer–Verlag New York, Inc., 1993.

LeBorn, "A Generic Ground Collision Avoidance System for Tactical Aircraft," *Cubic Defense Systems*, San Diego, California. IEEE National Aerospace and Electronics Conference, 1988.

Moller and Sachs, "Synthetic Vision for Enhancing Poor Visibility Flight Operations," *IEEE AES Systems*:27–42, 1994

Rueb, et al., "Evaluation of the C/EC/KC–135 Ground Collision Avoidance System (GCAS) (Study 2)," *Integrated Engineering and Tech. Management Directorate*, Wright–Patterson AFB, Final Report, 1993.

Shah, "Ground Collison Warning System Performance Criteria for High Maneuverability Aircraft," *Flight Stability and Control Branch* Wright Patterson AFB, 1988.

Stevens, "Terprom Helps Low–Altitute Flight,: Terrain $_{13}$Navigation System for Flying at Low Height," *Elektronica* 1986, (Dutch) w/English Transl.

"Safety Through Interactions and International Standards," *Proceedings of the Flight Safety Foundation*, 46$^{th}$ Annual International Air Safety Seminar, Kuala Lumpuir, Malaysia, 1993.

Williams and Mitchell, "Effects of Integrated Flight Path and Terrain Displays on Controlled Flight into Terrain," Center for Human–Machine Systems Research, School of Industrial and Systems Engineering, Georgia Institute of Technology.

Young, "Warning System Concepts to Prevent Controlled FLight Into Terrain (CFIT)," *Defense System Electronics Group*, Texas Instruments, Inc. IEEE, 1993.

"BAE Terrain Software Bound for USF–16," *Flight International*, August, 1993, Computer Printout.

"Technology and Air Attack," *Asian Defense Journal*, 1993, Computer Printout.

The F–16 Digital Terrain System, British Aerospace, The Institute of Electrical Engineers, 1995.

Fitzsimons, "Upgrade Classics—Navigating by Numbers," Defense System & Modernisation (DSM), Jun. 1, 1997, p. 11, v.10, No. 02, Computer Printout.

"Terrain Database and Their Use In Navigation and Collison Avoidance," Institute of Electrical Engineers, Electronics Division Colloquim, Professional Group E15, Radar Sonar and Navigation Systems, *Digest No. 1995/066*, 1995, paper by Allerton.

Kuchar and Hansman, Jr., "Part–Task Simulation Study of Candidate Terrian Alerting Display," Department of Aeronautics and Astronautics, Massachusetts Institute of Technology, Jun. 30, 1993.

Kuchar and Hansman, Jr., "Advanced Terrain Displays for Transport Category Aircraft," ASL, Department of Aeronautics & Astronautics, Massachusetts Institute of Technology, Aug. 23, 1991.

"The Future Flight Deck," The Flight Operations Group of the Royal Aeronautical Society and The Guild of Air Piolts and Air Navigators of London.

Hewitt et al., "A Ground and Obstacle Collision Avoidance Technique (GOCAT)," *IEEE*, May, 1991.

Moore, "We Have the Technology," *Flying Safety*, Jun., 1992.

Hughes, "Glass Cockpit Study Reveals Human Factors Problems,"*Aviation Week & Space Technology*, Aug. 7, 1989.

Hoffman and Brunham, "Airborne Electronic Map systems," *IEEE*, 769–772, 1981.

Burnham and Kline, "Airborne Electronic Terrain Map System, Part 2–Applications," *IEEE*, 786–789. 1981.

Sander, "Algorithms for an Adaptive Dynamic Window in Electronic Map systems," Air Force Wright Aeronautical Laboratories.

Weber and Opttek, "Airborne Electronic Terrain Map System," *IEEE*, 773–778, 1981.

Small, "The Electronic Terrain Map—A New Avionics Integrator—," Avionics Laboratory, Wright–Patterson Air Force Base, Ohio, 356–359.

Tang and Mealy,"Application of Multiple Model Estimation Techniques to a Recursive Terrain Height Correlation System," *IEEE*, 757–764, 1981.

Woodward and Hoover, "Passive Terrain Following Using Stored Map and Global Positioning System," *IEEE*, 779–785, 1981.

"Air Force Evaluating Model of Electronic Map Technology,"*Aviation Week & space Technology, 76*, Dec. 19, 1983.

Kuchar and Hansman, Jr., "An Exploratory Study of Plan–View Terrain Displays for Air Carrier Operations," *The International Journal of Aviation Psychology*, 3(1):39–54, 1993.

Paper re: Proceedings of the National Technical Meeting, The Institute of Navigation, Aneheim, California dated Jan. 20–23, 1987 (4 pages).

Paper re: A New Approach to CFIT Prevention: GCAS Ground Collision Avoidance System, Dassault Electronique, Rockwell Avionics, Author: Jean–Francis Manfroy and Lothar J. Taylor dated Nov. 1995 (12 pages).

Proctor, "Avionics Unit Eyes Expanded Markets," *Aviation Week & Space Technology*, Aug. 15, 1994, p. 41.

Proctor, "Terrain Alert Graphics Tested on cockpit Displays,"*Aviation Week & Space Technology*, August 8, 1984, p. 51.

Kerill, Tamara, "Satellite–Guided Airplane Flies Right Into the Future," *Chicago Sun–Time*, Oct. 28, 1984 p. 22.

Malm, Richard, "Engineers Can Tap Into Global Positioning System" *Engineering Times*, Apr., 1995 pp. 11–14.

GCAS Publication, provided by A/S Library Services, Source and Date Unknown, pp. 185–190.

* cited by examiner

METHODS, APPARATUS AND COMPUTER PROGRAM PRODUCTS FOR DETERMINING A CORRECTED DISTANCE BETWEEN AN AIRCRAFT AND A SELECTED RUNWAY

This application claims the benefit of U.S. Provisional Application Ser. No. 60/118,222, filed in the name of Kevin J Conner and Steven C. Johnson on Feb. 1, 1999, the complete disclosure of which is incorporated herein by reference.

FIELD OF THE INVENTION

The present invention relates generally to ground proximity warning systems for use in aircraft. More particularly, the apparatus, methods, and computer program products of the present invention relate to determining a corrected distance between an aircraft and a selected runway to thereby account for the altitude of the aircraft above the selected runway as the aircraft approaches the runway.

BACKGROUND OF THE INVENTION

An important advancement in aircraft flight safety has been the development of ground proximity warning systems. These warning systems analyze the flight parameters of the aircraft and the terrain surrounding the aircraft. Based on this analysis, these warning systems provide alerts to the flight crew concerning possible inadvertent collisions with terrain or other obstacles.

Two important aspects of ground proximity warning systems are the need to operate independent of user input and the need to reduce the number of nuisance alarms provided to the flight crew. In light of this, at least one ground proximity warning system has been developed that, for the most part, operates independent of user input and provides mechanisms to reduce the number of nuisance alarms published to the flight crew.

Specifically, to operate independent of user input, this ground proximity warning system continuingly selects a runway that is near the current position of the aircraft. The global coordinates and elevation of the selected runway are used by the ground proximity warning system for ground proximity warning calculations. For instance, the ground proximity warning system uses the flight parameters of the aircraft, such as the position, altitude, ground speed, track and heading of the aircraft, and the global coordinates and elevation of the selected runway to construct terrain clearance floor envelopes about the aircraft. Based on these terrain clearance floor envelopes, the ground proximity warning system provides alarms to the flight crew of any impending intersection of the flight path with terrain or obstacles.

In addition to aiding in the generation of terrain clearance floor envelopes independent of user input, the selected runway is also used to reduce the number of nuisance alarms generated. Specifically, the ground proximity warning system alters the terrain clearance floor envelopes based on the distance between the aircraft and selected runway to prevent the occurrence of nuisance alarms. As the aircraft approaches the selected runway, the terrain clearance floor envelopes are typically altered to reflect a landing approach pattern for the aircraft. Alteration of the terrain clearance floor envelopes based on a landing pattern reduces the number of nuisance alarms generated.

The ground proximity warning system also uses a restricted look ahead distance to reduce the occurrence of nuisance alarms. The restricted look ahead distance represents a distance ahead of the aircraft in which the ground proximity warning system will provide warnings to the flight crew. By restricting the distance in front of the aircraft for which alarms are generated, the number of nuisance alarms is reduced.

The number of nuisance alarms is also reduced by basing the value of the look ahead distance as a function of the distance between the aircraft and the selected runway. As an aircraft approaches a runway for landing, the ground proximity warning system reduces the value of the look ahead distance based on the proximity of the aircraft to the selected runway. Specifically, as illustrated in FIG. 1, the ground proximity warning system typically uses the coordinate distance 14 between the aircraft 10 and selected runway 12 for ground proximity warning calculations. With reference to FIG. 2, the ground proximity warning system determines the look ahead distance value by comparing a distance between the aircraft and selected runway to a look ahead distance equation, such as the equation depicted graphically in FIG. 2:

$$LAD_{Dist.\ to\ Runway}=(3.25/6)(\text{Distance to Runway})-0.3333,$$

for look ahead distance (LAD) values between 0.75 nm≦LAD≦4 nn corresponding to distances between the aircraft and runway of 2 to 8 nm. The look ahead distance equation is designed to reduce the look ahead distance of the ground proximity warning system as the aircraft approaches the runway to thereby reduce nuisance alarms.

While the use of a selected runway for terrain clearance floor envelopes and look ahead distance calculations is advantageous as it allows the ground proximity system to operate independent of the user input, there are some drawbacks. Specifically, because the ground proximity warning system does not receive user input concerning the destination of the aircraft, as the aircraft approaches the selected runway, the terrain clearance floor envelopes and look ahead distance value are typically reduced as though the aircraft is landing on the selected runway. Although reduction of the look ahead distance value and terrain clearance floor envelopes is advantageous for reducing nuisance alarms when the aircraft is actually landing on the runway, it may be less advantageous when the aircraft is merely flying near the runway en route to another destination.

To address this problem, the conventional ground proximity warning system typically places a lower limit on the look ahead distance value, if the aircraft has an altitude with respect to the runway that is greater than a predetermined altitude. For example, if the altitude of the aircraft above the runway is greater than 3500 ft, the ground proximity warning system may limit the look ahead distance value ($LAD_{Dist.\ to\ Runway}$) to a minimum value of, for example, 2.375 nm. As such, as the aircraft approaches the selected runway, the look ahead distance value will be reduced by the equation depicted graphically in FIG. 2 until the look ahead distance value is equal to the minimum look ahead distance value, i.e., 2.375 nm, at which point the look ahead distance value is no longer reduced, as depicted in dashed lines.

Although limiting the look ahead distance value to a minimum value based on the altitude of the aircraft above the runway is advantageous, there are some drawbacks to this approach. Specifically, the conventional ground proximity system does not adjust the minimum look ahead distance value for an aircraft that has an altitude with respect to the runway that is significantly higher than the predetermined altitude. For example, if the predetermined altitude is 3500 ft, an aircraft that is 20,000 ft above the selected runway will have the same minimum look ahead distance value as if the aircraft is 3500 ft above the selected runway. In light of this, a ground proximity warning system that accounts for the altitude of the aircraft above the selected runway in determining a distance between the aircraft and selected runway for ground proximity warning calculations would be desirable.

SUMMARY OF THE INVENTION

As set forth below, the apparatus, methods, and computer program products of the present invention may overcome many of the deficiencies identified with the use of the distance between an aircraft and selected runway for ground proximity warning calculations. The present invention provides several apparatus, methods, and computer program products for determining a corrected distance between an aircraft and a selected runway. Specifically, the present invention selects either the coordinate distance between the aircraft and the selected runway or a calculated distance value as the corrected distance value for ground proximity warning calculations. The calculated distance value is a distance value calculated based on a mathematical relationship between the altitude of the aircraft and a predetermined glideslope. The predetermined glideslope value is a maximum glideslope, above which, the aircraft is most likely not landing on the selected runway. The determination of the corrected distance between the aircraft and selected runway is therefore based on the aircraft's altitude and position with respect predefined glideslope.

Specifically, the predetermined glideslope defines a glideslope angle above which the aircraft is most likely not landing on the runway. If the altitude and distance of the aircraft is such that the aircraft has a glideslope angle with respect to the runway that exceeds the predetermined glideslope value, it is assumed that the aircraft is not landing on the selected runway. In this instance, the apparatus, methods, and computer program products select the calculated distance value, as opposed to the coordinate distance value for ground proximity warning calculations.

By selecting a corrected distance value based on the distance and altitude between the aircraft and runway and the predetermined glideslope, the present invention can alleviate some of the problems associated with using a selected runway for ground proximity warning calculations. Specifically, if the aircraft is positioned in relation to the selected runway such that it is unlikely that the aircraft is landing on the runway, the present invention selects a calculated distance value for use in the ground proximity warning calculations. This may be advantageous as the calculated distance value accounts for the altitude of the aircraft in relation to a predetermined glideslope.

The present invention provides several embodiments for determining a corrected distance between an aircraft and a selected runway. For example, one embodiment of the present invention provides an apparatus and method for determining a corrected distance between an aircraft and a selected runway based on an altitude and distance of the aircraft from the selected runway. The apparatus of this embodiment includes a processor. In operation, the processor compares the coordinate distance between the aircraft and selected runway and a calculated distance value calculated based on the altitude of the aircraft above the runway and a predetermined glideslope. The processor selects either the coordinate distance or the calculated distance value as the corrected distance between the aircraft and the selected runway based on a mathematical relationship between the coordinate and calculated distance values. For instance, in one embodiment, the processor compares the coordinate and calculated distance values and selects the larger of the values as the corrected distance between the aircraft and the selected runway.

As discussed above, the predetermined glideslope value defines a predefined relationship between altitude and distance to the selected runway. In one embodiment, the predetermined glideslope value is expressed by the equation:

$$X=(Y/\tan\theta)$$

where

θ=predetermined glideslope angle,

Y=altitude above the runway in ft, and

X=calculated distance value in ft.

In this embodiment of the present invention, the processor determines the calculated distance value based on this equation. The processor next compares the coordinate distance between the aircraft and the selected runway to the calculated distance value. If the calculated distance value exceeds the coordinate distance value, the processor determines that the aircraft has a glideslope angle with respect to the runway that exceeds the predetermined glideslope value. In this instance, the processor selects the calculated distance as the corrected distance to runway value. Likewise, if the calculated distance value is less than the coordinate distance value, the processor determines that the aircraft has a glideslope angle with respect to the runway that is less than the predetermined glideslope value. In this instance, the processor selects the coordinate distance as the corrected distance to runway value.

The present invention also provides computer program products for determining a corrected distance between an aircraft and a selected runway based on an altitude and distance of the aircraft from the selected runway. The computer program products include a computer readable storage medium having computer readable program code means embodied in the medium. The computer-readable program code means includes first computer instruction means for comparing a coordinate distance value representing a distance between the global coordinate values of the aircraft and the global coordinate values of the selected runway to a calculated distance value calculated based on the altitude of the aircraft above the runway and a predetermined glideslope. The computer-readable program code means also includes second computer instruction means for selecting one of the coordinate distance value and the calculated distance value as the corrected distance between the aircraft and the selected runway based on a mathematical relationship between the coordinate and calculated distance values.

The present invention also provides an apparatus and method for determining a corrected distance between an aircraft and a selected runway based on the position of the aircraft with respect to an envelope constructed about the selected runway, where the envelope represents a predetermined glideslope angle. In this embodiment of the present, the processor evaluates the altitude and distance between the aircraft and the selected runway with relation to the envelope constructed about the runway. If the aircraft is within the envelope, the processor selects the coordinate distance value representing a distance between the aircraft and the selected runway. However, if the aircraft is outside of the envelope, the processor selects a calculated distance value calculated based on the altitude of the aircraft above the runway and the predetermined glideslope.

Specifically, in one embodiment of the present invention, to determine whether the aircraft is inside the envelope constructed about the runway, the processor compares the coordinate and calculated distance values to each other. If the coordinate distance value is larger than the calculated distance value, the aircraft is inside the envelope. In this instance, the processor selects the coordinate distance as the corrected distance value used for ground proximity warning calculations. However, if the coordinate distance value is less than the calculated distance value, the aircraft is outside the envelope, and the processor selects the calculated distance as the corrected distance value.

Selection of the calculated distance value for ground proximity warning calculations when the aircraft is outside of the predefined envelope is typically advantageous. Specifically, the calculated distance value accounts for the altitude of the aircraft above the selected runway. Further, as the aircraft approaches the runway at a given altitude, the calculated distance value will correspond to a distance to runway value at the given altitude along the predefined envelope, while the actual distance value between the aircraft and selected runway will decrease. When the aircraft exceeds the predefined glideslope, the calculated distance value will correspond to a larger look ahead distance value than the actual distance value. As such, if the aircraft exceeds the predefined envelope, a larger look ahead distance value will be used for ground proximity warning calculations.

In addition to determining a corrected distance between the aircraft and a selected runway, the present invention also includes apparatus and methods for determining a look ahead distance value. In this embodiment, the processor compares the corrected distance value to a ground speed look ahead distance value and a roll angle look ahead distance value. In this embodiment, the ground speed look ahead distance value is based upon the ground speed of the aircraft and an assumed turning radius of the aircraft, and the roll angle look ahead distance value is based upon the roll angle of the aircraft and an actual turning radius of the aircraft. Based on this comparison, the processor selects one of the look ahead distances for use in ground proximity warning calculations. Specifically, in one embodiment, the processor selects the smaller of the calculated distance value, ground speed look ahead distance value, and the roll angle look ahead distance value as the look ahead distance value. The smaller of the look ahead distance values is typically selected to provide the most conservative look ahead distance to thereby reduce instances of nuisance alarms.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

For illustrative purposes, the various apparatus, methods, and computer program products of the present invention are illustrated and described below in conjunction with the ground proximity warning system of U.S. Pat. No. 5,839,080 to Muller, entitled "Terrain Awareness System" which is assigned to the assignee of the present application. The contents of U.S. Pat. No. 5,839,080 are incorporated herein by reference.

Figure 3:
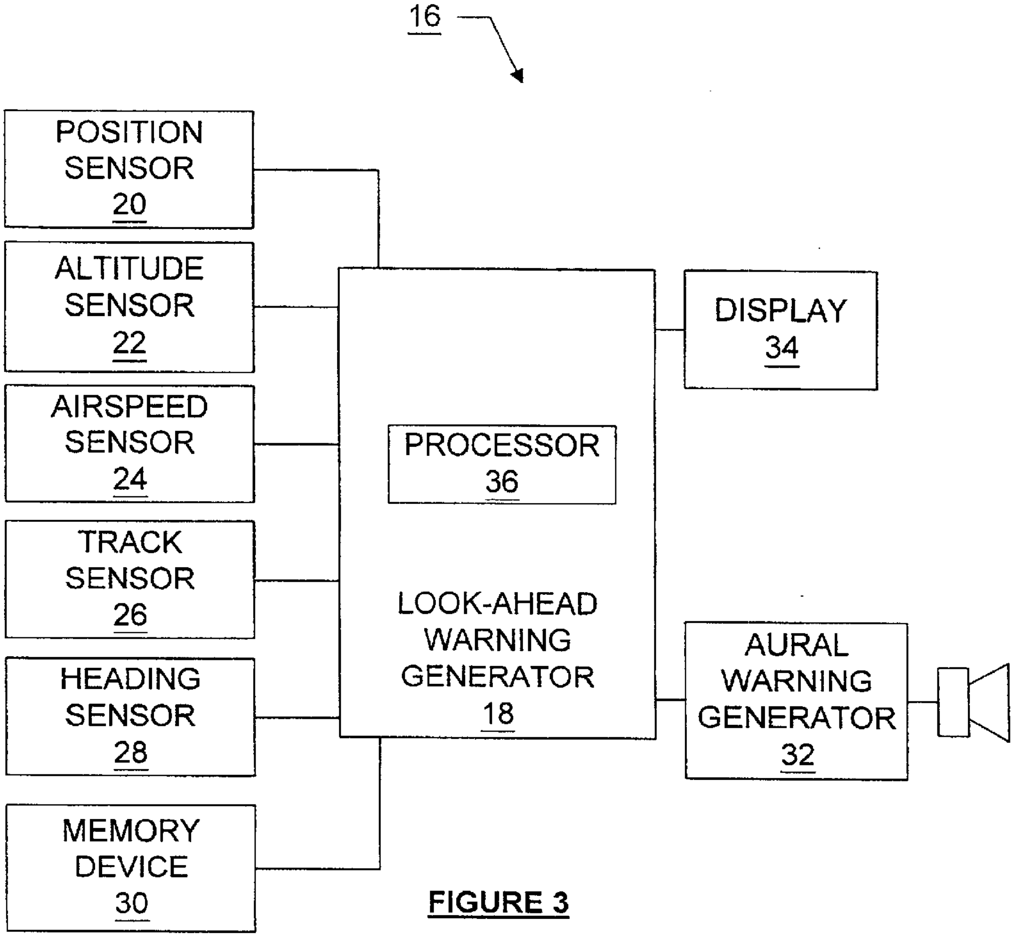
FIG. 3 is a block diagram of an apparatus for determining a corrected distance between an aircraft and selected runway according to one embodiment of the present invention.

FIG. 3 depicts many of the components of the ground proximity warning system of U.S. Pat. No. 5,839,080 in simplified block form for illustrative purposes, however, it is understood that the functions of these blocks are consistent with and contain many of the same components as the ground proximity warning system described in U.S. Pat. No. 5,839,080. The ground proximity warning system 16 includes a look-ahead warning generator 18 that analyzes terrain and aircraft data and generates terrain profiles surrounding the aircraft. Based on these terrain profiles and the position, track, and ground speed of the aircraft, the look-ahead warning generator generates aural and/or visual warning alarms related to the proximity of the aircraft to the surrounding terrain. Some of the sensors that provide the look-ahead warning generator with data input concerning the aircraft are depicted. Specifically, the look-ahead warning generator receives positional data from a position sensor 20. The position sensor may be a portion of a global positioning system (GPS), inertial navigation system (INS), or flight management system (FMS). The look-ahead warning generator also receives altitude and airspeed data from an altitude sensor 22 and airspeed sensor 24, respectively, and aircraft track and heading information from track 26 and heading 28 sensors, respectively.

In addition to receiving data concerning the aircraft, the look-ahead warning system also receives data concerning the terrain surrounding the aircraft. Specifically, the look-ahead warning generator is also connected to a memory device 30 that contains a searchable data base of data relating, among other things, to the position and elevation of various terrain features and also elevation, position, and quality information concerning runways.

In normal operation, the look-ahead warning generator receives data concerning the aircraft from the various sensors. Additionally, the look-ahead warning generator accesses terrain and airport information from the memory device concerning the terrain surrounding the aircraft and a selected runway-typically the runway that is closest in proximity to the aircraft's current position. Based on the current position, distance to the selected runway, altitude above the selected runway, speed, track, etc. of the aircraft, the look-ahead warning generator generates terrain warning and caution envelopes and generates alerts via either an aural warning generator 32 and/or a display 34 as to terrain that penetrate the terrain warning and caution envelopes. In addition, the look-ahead warning generator generates a terrain clearance floor and produces alerts if the aircraft falls below the terrain clearance floor, such as during landing.

As discussed above, the present invention provides apparatus, methods, and computer program products for determining a corrected distance between an aircraft and a selected runway. Specifically, the apparatus, methods, and computer program products of the present invention compare the distance and altitude between the aircraft and a selected runway to a predetermined glideslope, which defines a glideslope angle, above which the aircraft is most likely not landing on the runway. If the altitude and distance of the aircraft are such that the aircraft has a glideslope angle with respect to the runway that exceeds the predetermined glideslope value, it is assumed that the aircraft is not landing on the selected runway. In this instance, the apparatus, methods, and computer program products select a calculated distance value, as opposed to a coordinate distance value for ground proximity warning calculations. In this context, the calculated distance value is a distance value calculated based on a mathematical relationship between the altitude of the aircraft and a predetermined glideslope, as opposed to the coordinate distance value, which is a physical distance between the aircraft and the selected runway.

By selecting a corrected distance value based on the distance and altitude between the aircraft and runway and the predetermined glideslope, the present invention can alleviate some of the problems associated with using a selected runway for ground proximity warning calculations. Specifically, if the aircraft is positioned in relation to the selected runway such that it is unlikely that the aircraft is landing on the runway, the present invention selects a calculated distance value for use in the ground proximity warning calculations. This may be advantageous as the calculated distance value accounts for the altitude of the aircraft in relation to a predetermined glideslope.

As such, with reference to FIG. 3, an apparatus for determining a corrected distance between an aircraft and selected runway is illustrated. In one embodiment of the present invention, the apparatus includes a processor 36 located in the look-ahead warning generator. The processor may either be part of the processor of the look-ahead warning generator or it may be a separate processor located either internal or external to the look-ahead warning generator.

Figure 4:
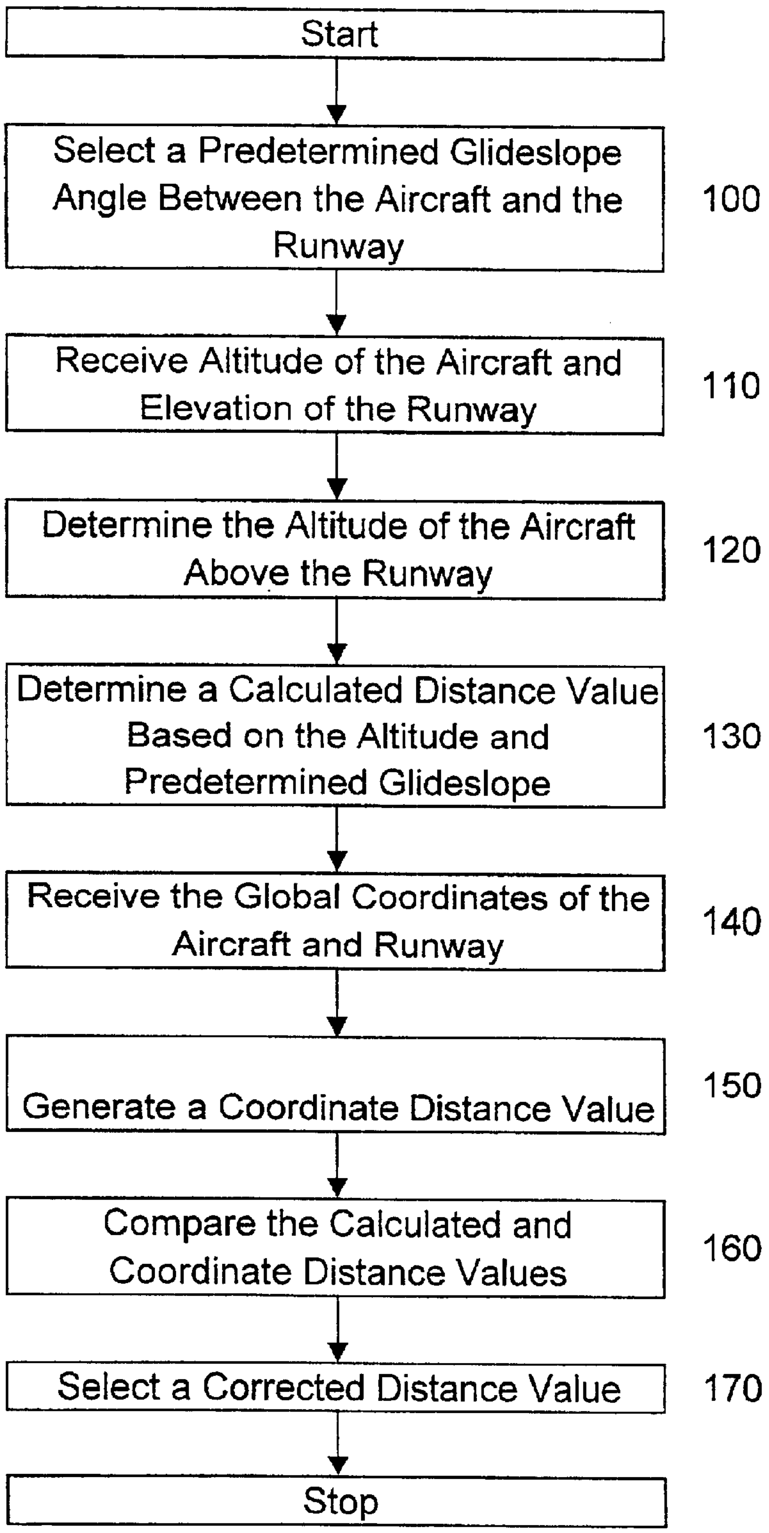
FIG. 4 is a block diagram of the operations performed to determine a corrected distance between an aircraft and selected runway according to one embodiment of the present invention.
Figure 5:
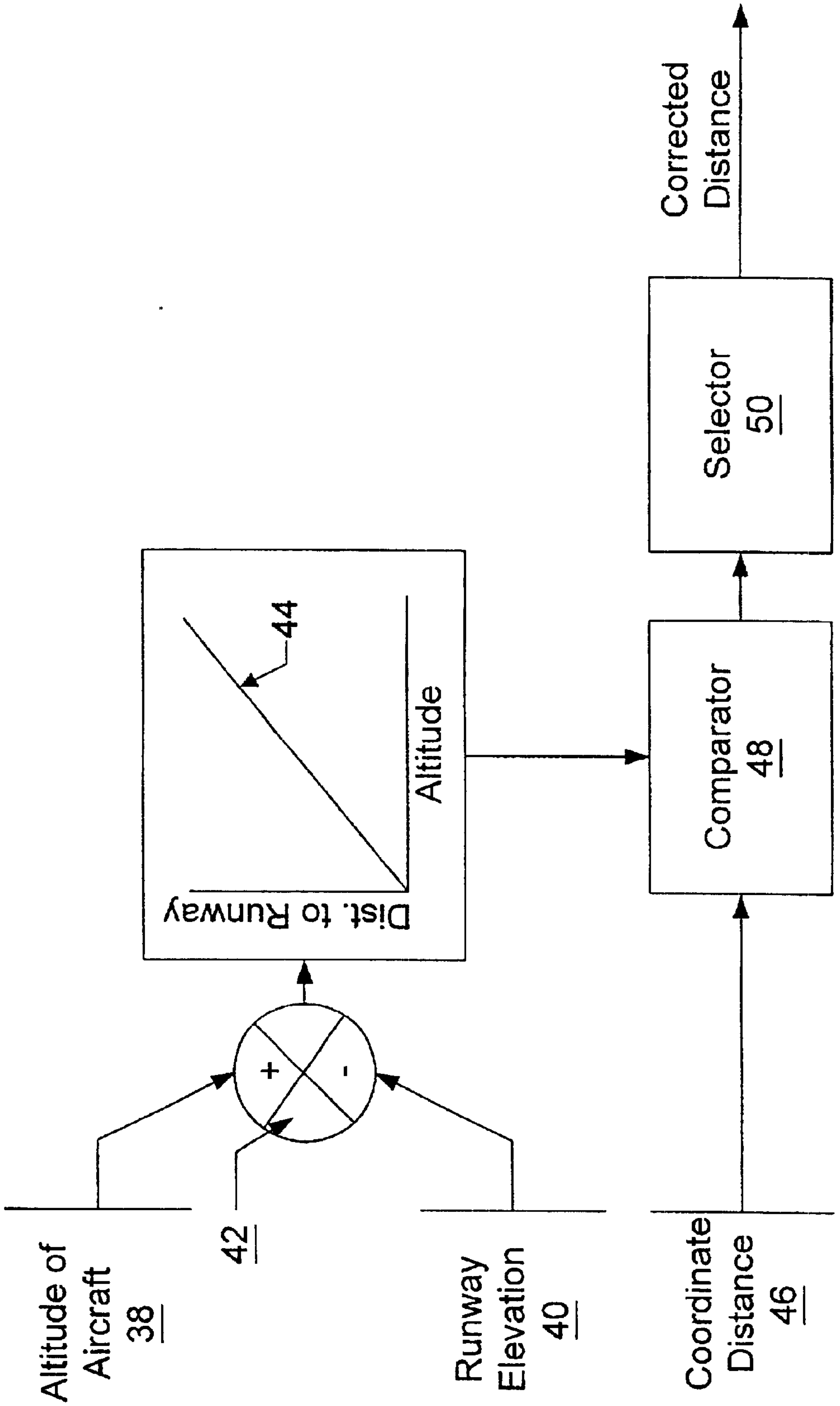
FIG. 5 is also a block diagram of the operations performed to determine a corrected distance between an aircraft and selected runway according to one embodiment of the present invention.

With reference to FIGS. 4 and 5, the determination of the corrected distance between an aircraft and selected runway is illustrated. Specifically, FIG. 4 is an operational flow diagram, while FIG. 5 depicts the operations in block diagram form. To determine a corrected distance between an aircraft and selected runway, the processor initially receives the altitude 38 of the aircraft from the altitude sensor 22, shown in FIG. 3, and the elevation of the selected runway 40 from the searchable data base of the memory device 30, shown in FIG. 3. (See step 110). The processor first determines the altitude of the aircraft above the runway by subtracting the altitude of the aircraft from the elevation of the runway in a summer 42. (See step 120). The processor next determines a calculated distance value based on the altitude of the aircraft above the runway and a predetermined glideslope value 44. (See step 130). The predefined glideslope represents a predefined relationship, typically defined in terms of a glideslope angle, between the altitude above and the distance to the selected runway. In this embodiment, the calculated distance value is determined by applying the altitude of the aircraft above the runway to the predefined glideslope. The distance to the runway corresponding to the altitude along the predefined glideslope is the calculated distance value.

The processor also determines a coordinate distance value. Specifically, the processor receives data concerning the global coordinates of the aircraft from the position sensor 20, shown in FIG. 3, and the global coordinates of the selected runway from the searchable data base of the memory device 30, shown in FIG. 3. (See step 140). The processor generates a coordinate distance value 46 representing a distance between the global coordinate values of the aircraft and the global coordinate values of the selected runway. (See step 150). The processor compares the coordinate and the calculated distance values with a comparator 48, (see step 160), and selects with a selector 50 one of the distance values as the corrected distance between the aircraft and the selected runway based on a mathematical relationship between the coordinate and calculated distance values. (See step 170). For example, in one embodiment of the present invention, the processor selects the larger of the coordinate distance or the calculated distance values as the corrected distance value between the aircraft and the selected runway.

FIG. 5, illustrates a comparator and selector for determining a corrected distance to runway. It must be understood that these may be separate components or they may represent functions performed by the processor.

As discussed above, the present invention determines a calculated distance value based on the positional relationship of the aircraft with respect to the selected runway. The calculated distance value is based on the relationship of the altitude of the aircraft with respect to a predefined glideslope. Specifically, the processor of the present invention compares the altitude of the aircraft to the predefined glideslope and determines a calculated distance. For example, in one embodiment, the predefined glideslope is defined by the following equation:

$$X=(Y/\tan\theta)$$

where

θ=predetermined glideslope angle,

Y=altitude above the runway in ft, and

X=calculated distance value in ft.

In this embodiment of the present invention, the processor initially determines a predetermined glideslope angle between the aircraft and the runway. (See step 100). The predetermined glideslope angle is typically dependent upon the type of aircraft. Specifically, aircraft typically approach a runway for landing at a desired or recommended glideslope angle. Glideslope angles exceeding these desired or recommended limits may be dangerous for landing. For example, many commercial aircraft have a maximum glideslope angle of 6 or 7°, while smaller aircraft have desired or recommended glideslopes in the range of 3 to 7°. The present invention typically selects a predetermined glideslope that is either a maximum or near maximum glideslope angle for landing the aircraft.

For example, in one embodiment, the predetermined glideslope angle is 6°. In this embodiment, the predetermined glideslope 44, shown in FIG. 5, is a line defined by the equation:

$$Y=m(X)+b$$

or in instances where there is no offset in the Y direction, i.e., b=0, then $$Y=(1\text{ nm}/600\text{ ft})(X)$$

where

Y=calculated distance to runway in nm, and

X=altitude of the aircraft above the runway ft.

In this embodiment, the processor determines the altitude of the aircraft above the selected runway, (see step 120), and using the predetermined glideslope angle and the altitude above the runway, determines a calculated distance value. Specifically, using the above equation for a glideslope of 6°, the processor applies the altitude (X) and solves for the calculated distance to runway (Y). The processor next compares the coordinate and the calculated distance values and selects the larger of the distance values as the corrected distance between the aircraft and the selected runway. (See step 170).

Figure 6A:
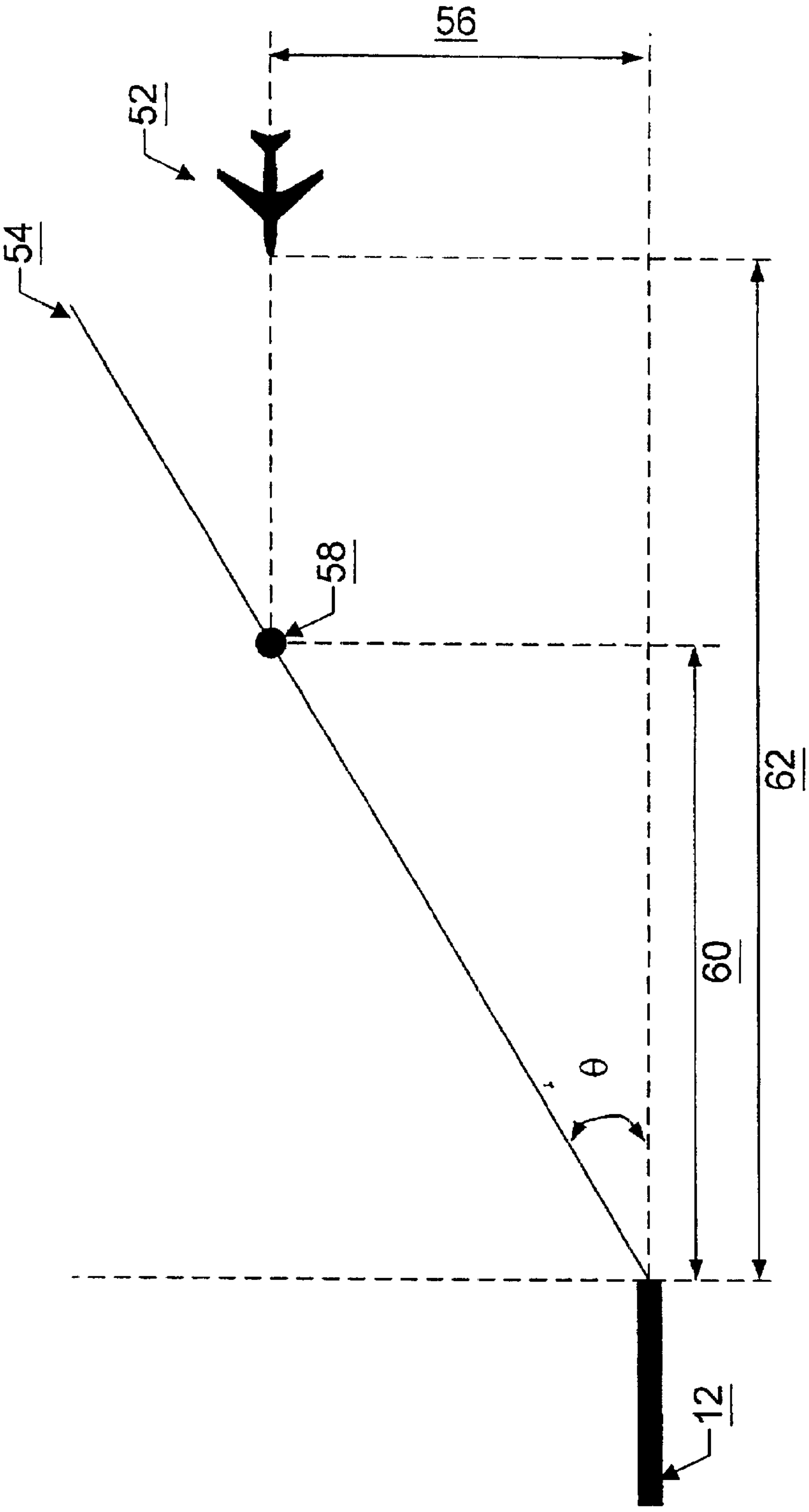
FIGS. 6A and 6B are side views respectively illustrating graphically the determination of a corrected distance between an aircraft and selected runway based on the position of the aircraft with respect to the runway according to one embodiment of the present invention.
Figure 6B:
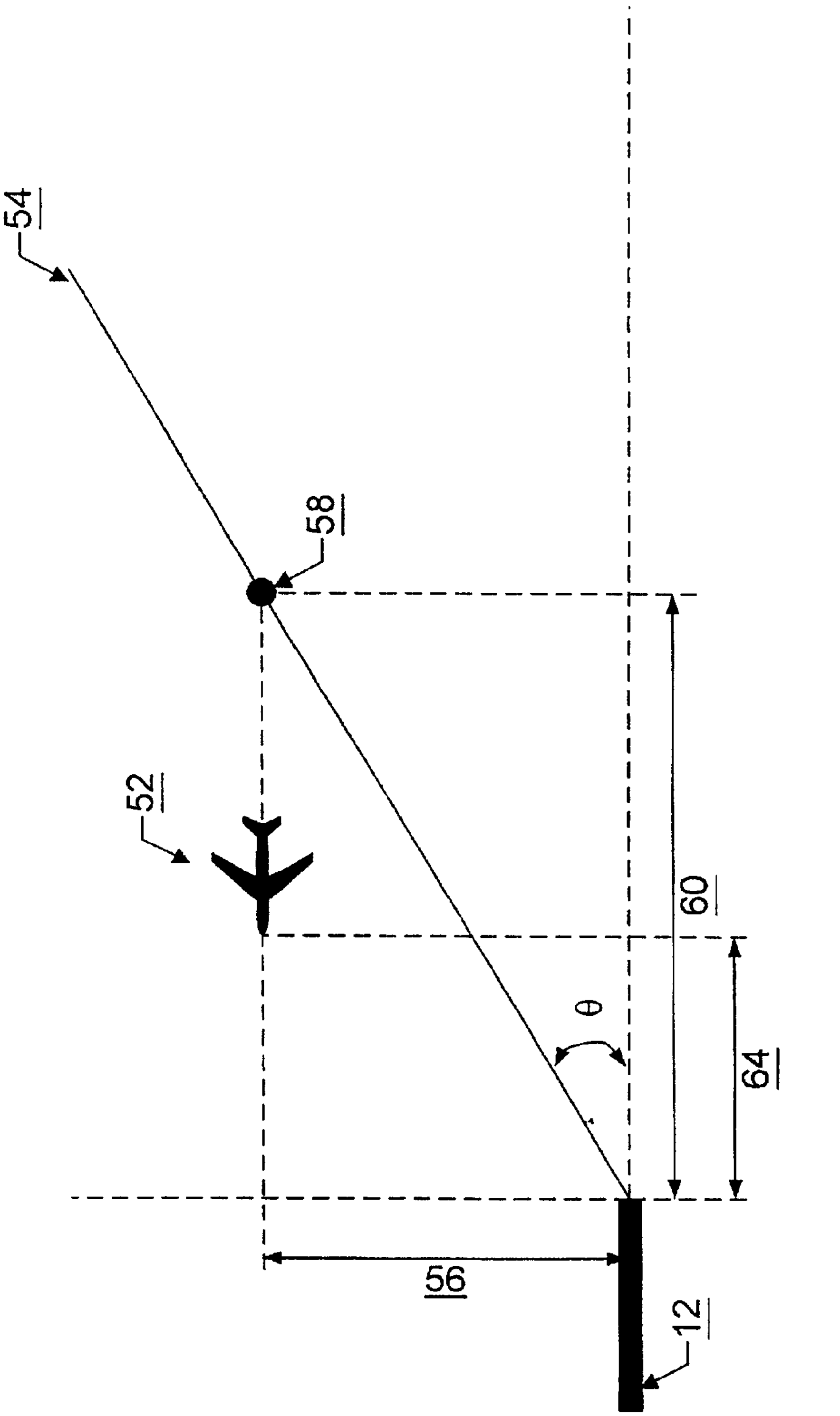

As discussed above, the apparatus and method of the present invention use the comparison of a calculated distance value to a coordinate distance value to determine whether the aircraft has exceeded a predefined glideslope and to determine a corrected distance to runway. FIGS. 6A and 6B further illustrate this determination. Specifically, FIG. 6A illustrates an instance where the aircraft 52 is located inside a predefined glideslope 54. In this embodiment, the predefined glideslope is θ=6°, which represents a maximum desired glideslope for landing of the aircraft. To determine the corrected distance value, the processor first determines the altitude 56 of the aircraft above the runway. (See step 120). The altitude of the aircraft is then applied to the equation:

$$X=(Y/\tan\theta)$$

or $$X=(altitude/\tan 6°).$$

As indicated by the dashed lines, the processor essentially places the aircraft on the predetermined glideslope 54 at a position 58 corresponding to the altitude of the aircraft. This process generates a calculated distance value 60 between the position 58 of the aircraft on the predetermined glideslope and the selected runway. (See step 130).

The processor also determines a coordinate distance value. Specifically, the processor next generates a coordinate distance value 62 representing an actual or physical distance between the global coordinate values of the aircraft and the global coordinate values of the selected runway. (See step 150). The processor compares the coordinate 62 and the calculated distance 60 values and selects the larger. This comparison determines the position of the aircraft with respect to the predetermined glideslope and which distance value should be used for ground proximity warning calculations. Specifically, in this instance, the coordinate distance value 62 is larger than the calculated distance value 60 indicating that the aircraft is within the predefined glideslope. As such, the processor selects the coordinate distance value as the corrected distance between the aircraft and the selected runway for use in ground proximity calculations. (See step 170).

FIG. 6B illustrates an instance where the glideslope of the aircraft with respect to the runway has exceeded the predetermined glideslope 54, i.e., the aircraft would have to exceed the predetermine glideslope angle in order to land on the selected runway. In this instance, when the processor applies the altitude of the aircraft to the equation, the processor again essentially places the aircraft on the predetermined glideslope 54 at a position 58 corresponding to the altitude of the aircraft. This process generates a calculated distance value 60 between the position 58 of the aircraft on the predetermined glideslope and the selected runway. (See step 130).

After the processor has determined a calculated distance value, the processor next generates a coordinate distance value 64 representing a distance between the global coordinate values of the aircraft and the global coordinate values of the selected runway. (See step 150). The processor next compares the coordinate 64 and the calculated distance 60 values and selects the larger. This comparison determines the position of the aircraft and which distance value should be used for ground proximity warning calculations. Specifically, in this instance, the calculated distance value 60 is larger than the coordinate distance value 64 indicating that the aircraft has exceeded the predefined glideslope. The processor selects the calculated distance value as the corrected distance between the aircraft and the selected runway for use in ground proximity calculations. (See step 170). As such, in instances where the aircraft nears the selected runway, but is at a position with respect to the runway that exceeds the predetermined glideslope, a corrected distance is used for ground proximity warning calculations.

Selection of the calculated distance value for ground proximity warning calculations when the aircraft is outside of the predefined envelope is typically advantageous. Specifically, the calculated distance value accounts for the altitude of the aircraft above the selected runway. Further, as the aircraft approaches the runway at a given altitude, the calculated distance value will correspond to a distance to runway value at the given altitude along the predefined envelope, while the actual distance value between the aircraft and selected runway will decrease. When the aircraft exceeds the predefined glideslope, the calculated distance value will correspond to a larger look ahead distance value than the actual distance value. As such, if the aircraft exceeds the predefined envelope, a larger look ahead distance value will be used for ground proximity warning calculations.

In addition to providing apparatus and methods, the present invention also provides computer program products for determining a corrected distance between an aircraft and selected runway. The computer program products have a computer readable storage medium having computer readable program code means embodied in the medium. With reference to FIG. 3, the computer readable storage medium may be part of the memory device 30, and the processor 36 of the present invention may implement the computer readable program code means to determine a corrected distance between the aircraft and selected runway as described in the various embodiments above.

The computer-readable program code means includes first computer instruction means for comparing a coordinate distance value representing a distance between the global coordinate values of the aircraft and the global coordinate values of the selected runway to a calculated distance value calculated based on the altitude of the aircraft above the runway and a predetermined glideslope. Further, the computer-readable program code means also includes second computer instruction means for selecting one of the coordinate distance and the calculated distance value as the corrected distance between the aircraft and the selected runway based on a mathematical relationship between the coordinate and calculated distance values.

With reference to the second computer instruction means, in one embodiment, the second computer instruction means includes means for selecting the larger of the coordinate distance and the calculated distance value as the corrected distance between the aircraft and the selected runway.

In one embodiment, the computer-readable program code means further includes third computer instruction means for receiving an altitude of the aircraft and an elevation of the selected runway and fourth computer instruction means for subtracting the altitude of the aircraft from the elevation of the runway to generate a value representing the altitude of the aircraft above the runway. The computer-readable program code means may further include fifth computer instruction means for determining the calculated distance value to be equal to the distance to the selected runway associated with the altitude by the predefined relationship.

For instance, in one embodiment, the predefined glideslope defines a predefined relationship between altitude and distance to the selected runway expressed as:

$$X=(Y/\tan\theta)$$

where

θ=predetermined glideslope angle,

Y=altitude above the runway in ft, and

X=calculated distance value in ft.

In this embodiment, the fifth computer instruction means includes means for determining the calculated distance value based on the predetermined glideslope angle and the altitude of the aircraft above the selected runway.

In this regard, FIGS. 3, 4, and 5 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s). Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

As discussed previously, the distance between the aircraft and selected runway is used for many of the ground proximity warning calculations. For example, the distance to a selected runway is used for generating terrain clearance floor envelopes about the aircraft. Importantly, the distance between the aircraft and a selected runway is also used for generating a look ahead distance value used for ground proximity warning alarms. Specifically, with reference to U.S. Pat. No. 5,839,080 to Muller, the ground proximity warning system generates at least two different look head distance values. One look ahead distance value is used for terrain advisory signals and a second look ahead distance value is used for terrain warning signals that require more immediate evasive action.

The look ahead distance for terrain advisory signals is typically based upon one of the following calculated values: 1) look ahead distance based on distance to runway, 2) ground speed look ahead distance value, or 3) the roll angle look ahead distance value. More particularly, the ground proximity warning system typically calculates each of the above look ahead distance values and selects the smallest of these values as the look ahead distance for the terrain advisory.

Figure 7:
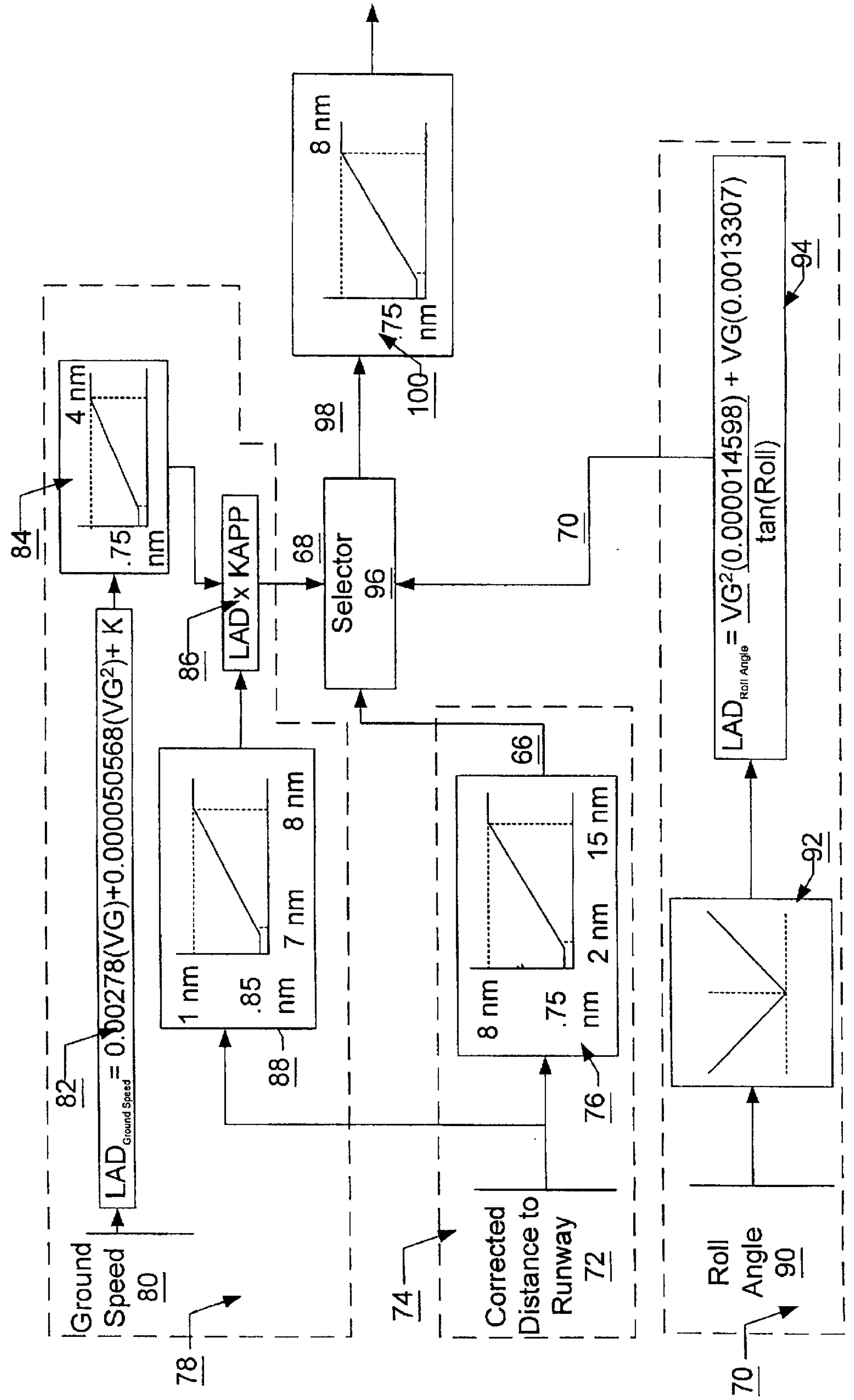
FIG. 7 is a block diagram of the operations performed to determine a look ahead distance for use in ground proximity warning calculations according to one embodiment of the present invention.
Figure 8:
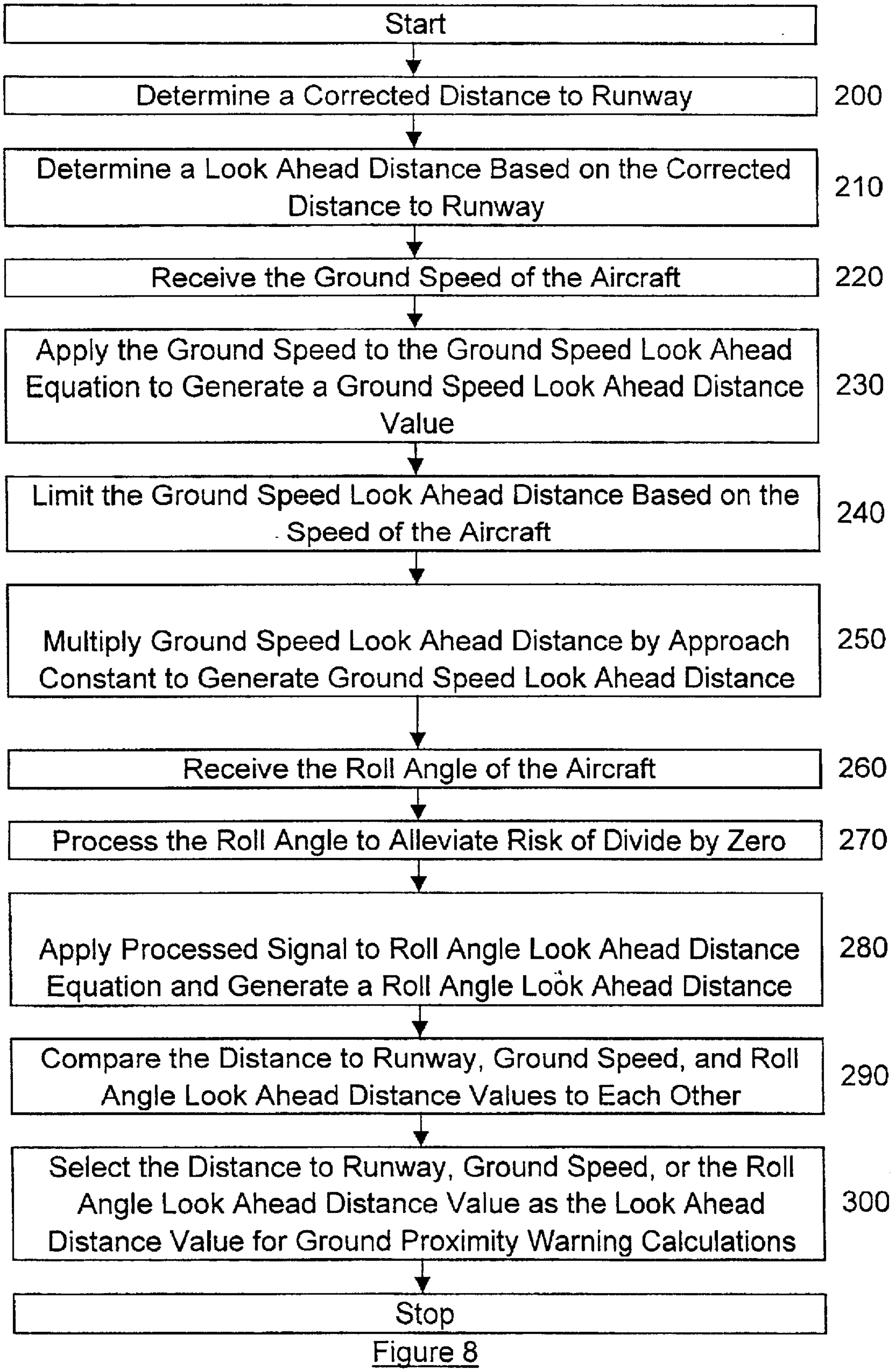
FIG. 8 is also a block diagram of the operations performed to determine a look ahead distance for use in ground proximity warning calculations according to one embodiment of the present invention.

Specifically, with reference to FIGS. 7 and 8, the determination of the look ahead distance advisory is illustrated. Specifically, FIG. 7 depicts the operations in block diagram form, while FIG. 8 is an operational flow diagram. It must be understood that the various steps and/or elements shown in FIGS. 7 and 8 may be performed by the processor or by discrete components communicably connected to the processor. It must also be understood that the determination of the three look ahead distance values may be performed in any order by the processor or simultaneously by the processor.

With reference to FIG. 7, the processor of one embodiment of the present invention determines at least three separate look ahead distance values: 1) look ahead distance based on distance to runway 66, 2) ground speed look ahead distance 68, and 3) the roll angle look ahead distance 70.

Figure 1:
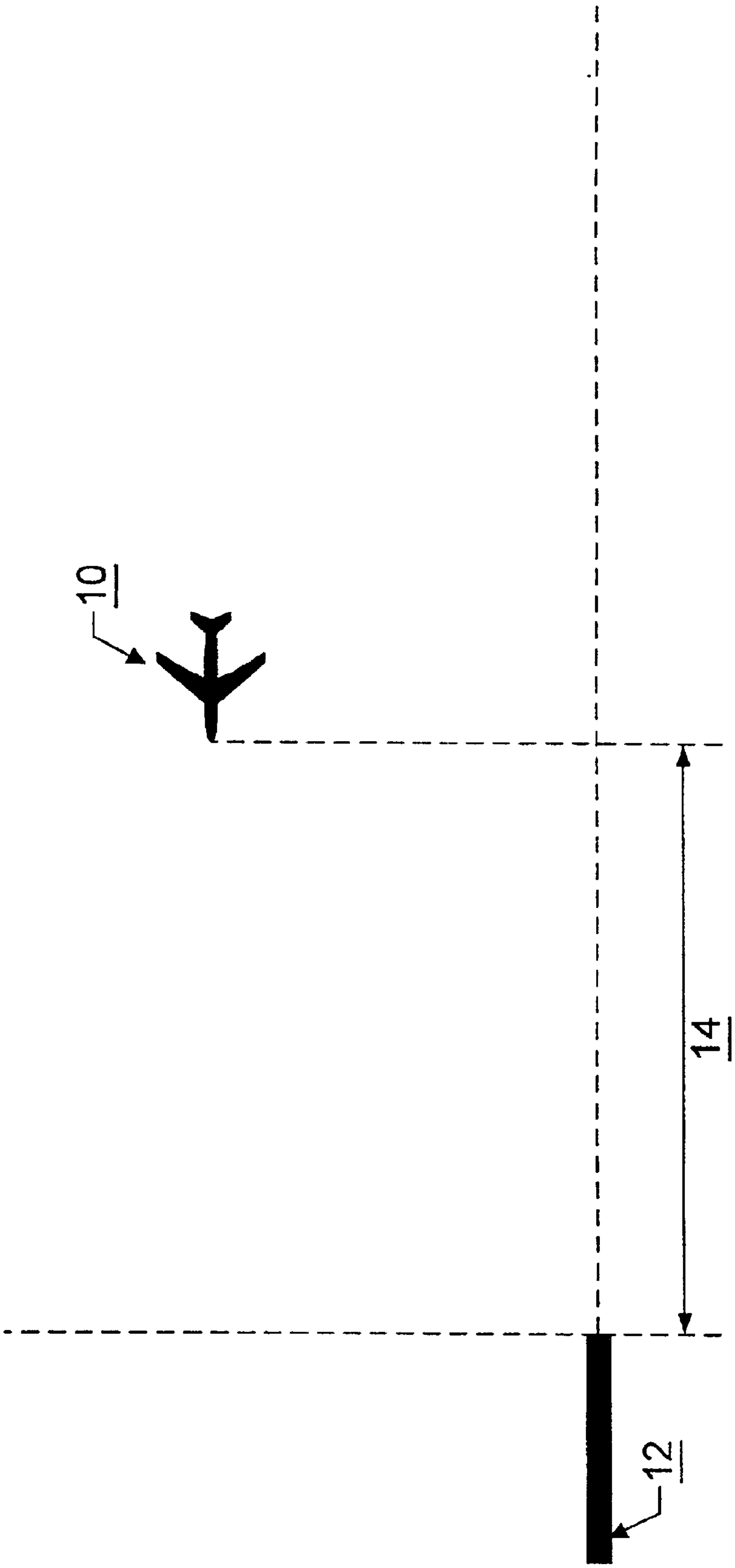
FIG. 1 is a side view illustrating graphically the distance between an aircraft and selected runway.
Figure 2:
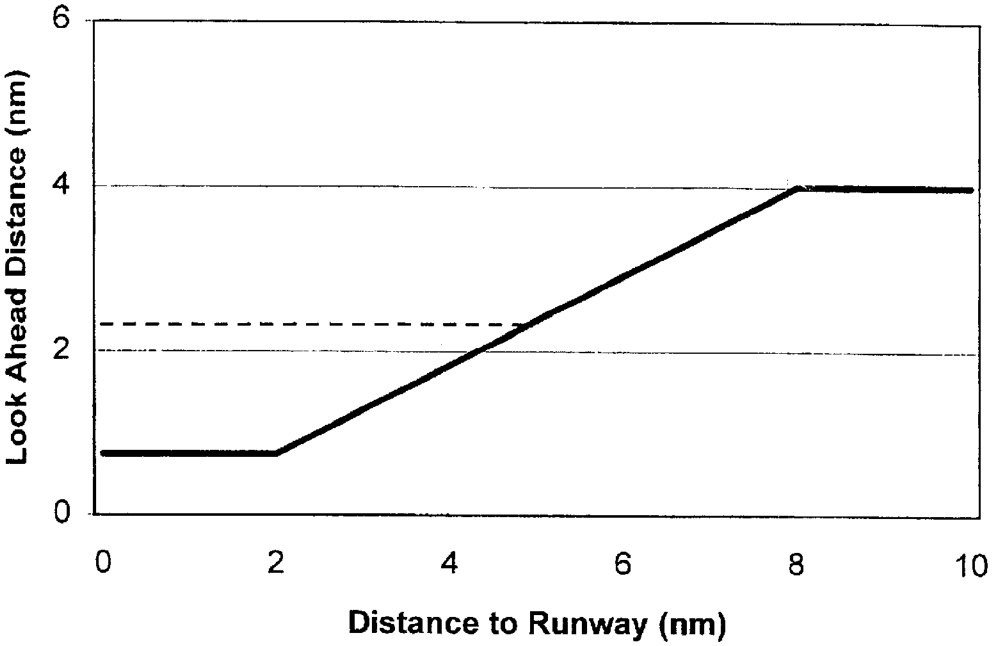
FIG. 2 is a graphic illustration of the look ahead distance value as a function of the distance between an aircraft and selected runway.

In particular, using the operations shown in FIG. 7, (see block 74), the processor initially determines a look ahead distance value based on the corrected distance 72 to a selected runway. Specifically, with reference to FIGS. 7 and 8, as previously described above in FIGS. 3, 4, and 5, the processor initially determines a corrected distance to runway 72. (See step 200). This corrected distance is then applied to the equation 76 earlier depicted in FIG. 2. This equation provides look ahead distance as a function of distance between an aircraft and selected runway, in this case, the corrected distance. Based on this equation, the processor determines a look ahead distance 66. (See step 210).

Specifically, the corrected distance value is applied to the equation:

$$LAD_{Corrected\ Dist.}=(7.25/13)(\text{Distance to Runway})-0.365,$$

for look ahead distance (LAD) values between 0.75 nm≦LAD≦8 nm corresponding to corrected distances between the aircraft and runway of 2 nm to 15 nm. As can be seen from this equation, for corrected distance values between 2 nm to 15 nm, the look ahead distance value is in the range of 0.75 nm to 8 nm. For corrected distance values less than 2 nm, the look ahead distance is 0.75 nm, and for corrected distance values greater than 15 nm, the look ahead distance is 8 nm. It will be noted that in the earlier discussion of this equation, the look ahead distance value was limited to a maximum value of 4 nm. In the present invention, the maximum limit has been increased to 8 nm. This change in maximum limit has altered the slope and y-intercept of the equation somewhat.

In addition to calculating a look ahead distance based on the corrected distance between the aircraft and selected runway, the processor also determines a ground speed look ahead distance value 68. The ground speed look ahead distance is based on a look ahead time for a single turning radius based on the ground speed of the aircraft and the banking and turning radius of the aircraft. For example, in one embodiment, the ground speed look ahead distance is based on two turning radii of the aircraft at a bank angle of 30° with an added 10 seconds of reaction time. In this embodiment, the ground speed look ahead distance value is defined by the following equation 82:

$$LAD_{Ground\ Speed}=0.00278(Vg)+0.000050568(Vg^2)+K$$

where

LAD=ground speed look ahead distance in nm,

Vg=ground speed in kts, and

K=constant.

The derivation of this equation is discussed in detail in U.S. Pat. No. 5,839,080 to Muller and is also provided later below.

With reference to the operations shown in FIG. 7, (see block 78), and FIG. 8, to determine the ground speed look ahead distance value, the processor receives the ground speed 80 of the aircraft from the airspeed sensor 24, shown in FIG. 3. (See step 220). The processor applies the ground speed to the ground speed look ahead equation 82 and calculates a ground speed look ahead distance value. (See step 230).

Optionally, the ground speed look ahead distance value may next be compared to a limiter 84. The limiter limits the ground speed look ahead distance by upper and lower limits based on the speed of the aircraft. (See step 240). Specifically, in one embodiment, the limiter limits the ground speed look ahead distance value to a lower limit of 0.75 nm to 1.5 nm and an upper limit of 4 nm. In another embodiment, the ground speed look ahead distance value is not limited at all.

The ground speed look ahead distance is next multiplied by an approach constant $K_{APP}$ 86 to generate a ground speed look ahead distance value 68. (See step 250). The approach constant $K_{APP}$ is based on the corrected distance between the aircraft and selected runway. Specifically, the corrected distance value 72 is applied to a determiner 88. The determiner compares the corrected distance to an equation relating distance to runway to an approach constant. For example, in one embodiment, for corrected distance values between 7 nm and 8 nm, the approach constant $K_{APP}$ ranges from 0.85 nm to 1 nm. For corrected distance values less than 7 nm, the approach constant $K_{APP}$ is 0.85 nm, and for corrected distance values greater than 8 nm, the approach constant $K_{APP}$ is 1 nm.

In addition to calculating a look ahead distance based on the distance between the aircraft and selected runway and a look ahead distance based on ground speed, the processor also determines a look ahead distance based on the actual roll angle of the aircraft 90. The roll angle look ahead distance is based on a look ahead time for the actual turning radius of the aircraft and an added reaction delay time. For example, in one embodiment, the roll angle look ahead distance is based on the actual turning radius of the aircraft and an added 5 seconds of reaction time. In this embodiment, the roll angle look ahead distance is determined by the following equation 94:

$$LAD_{Roll\ Angle}=(Vg^2(0.000014598)/\tan(\text{Roll}))+Vg(0.0013307)+K$$

where

LAD=ground speed look ahead distance in nm,

Vg=ground speed in kts,

K=constant, and

Roll=actual roll angle of the aircraft.

The derivation of this equation is discussed in detail later below.

With reference to the operations shown in FIG. 7, (see block 70), and FIG. 8, to determine the roll angle look ahead distance value, the processor receives the roll angle 90 of the aircraft. (See step 260). The processor first processes the roll angle by taking the absolute value, (see block 92), of the roll angle. (See step 270). The processed signal is then applied to the roll angle look ahead distance equation 94 to determine the roll angle look ahead distance value. (See step 280).

After the processor has generated look ahead distance values based on the corrected distance to runway, ground speed, and roll angle of the aircraft, the processor next compares each of the three values with a selector 96, (see step 290), and selects a look ahead distance 98 for ground proximity warning calculations. (See step 300). For instance, in one embodiment, the processor selects the smallest of the three look ahead distance values for ground proximity warning calculations. The smaller of the look ahead distance values is typically selected to provide the most conservative look ahead distance to thereby reduce instances of nuisance alarms.

Optionally, the selected look ahead distance value 98 may also be applied to a second limiter 100 to limit the look ahead distance value based on the corrected distance between the aircraft and selected runway. For instance, in one embodiment, the look ahead distance value is limited to a lower limit of 0.75 nm and an upper limit of 8 nm.

As described above, the various apparatus of the present invention includes a processor. It must be understood that the processor may consist of any number of devices. The processor may be a data processing device, such as a microprocessor or microcontroller or a central processing unit. The processor could be another logic device such as a DMA (Direct Memory Access) processor, an integrated communication processor device, a custom VLSI (Very Large Scale Integration) device or an ASIC (Application Specific Integrated Circuit) device.

As discussed above, the present invention determines three different look ahead distance values: 1) one based on the corrected distance between the aircraft and selected runway, 2) one based on the ground speed of the aircraft, and 3) one based on the actual roll angle of the aircraft. While the look ahead distance value based on corrected distance to runway is determined by application of the corrected distance to an equation relating distance to look ahead distance, the remaining two look ahead distance values are determined based on equations relating the ground speed and roll angle of the aircraft and flight characteristics of the aircraft. Specifically, the ground speed look ahead distance value is based on a look ahead time for an assumed turning radius of the aircraft, the ground speed of the aircraft, and the banking and turning radius of the aircraft, while the roll angle look ahead distance value is based on the actual turning radius of the aircraft and the ground speed of the aircraft. The derivation of the equations for these two look ahead values is discussed below.

Figure 9:
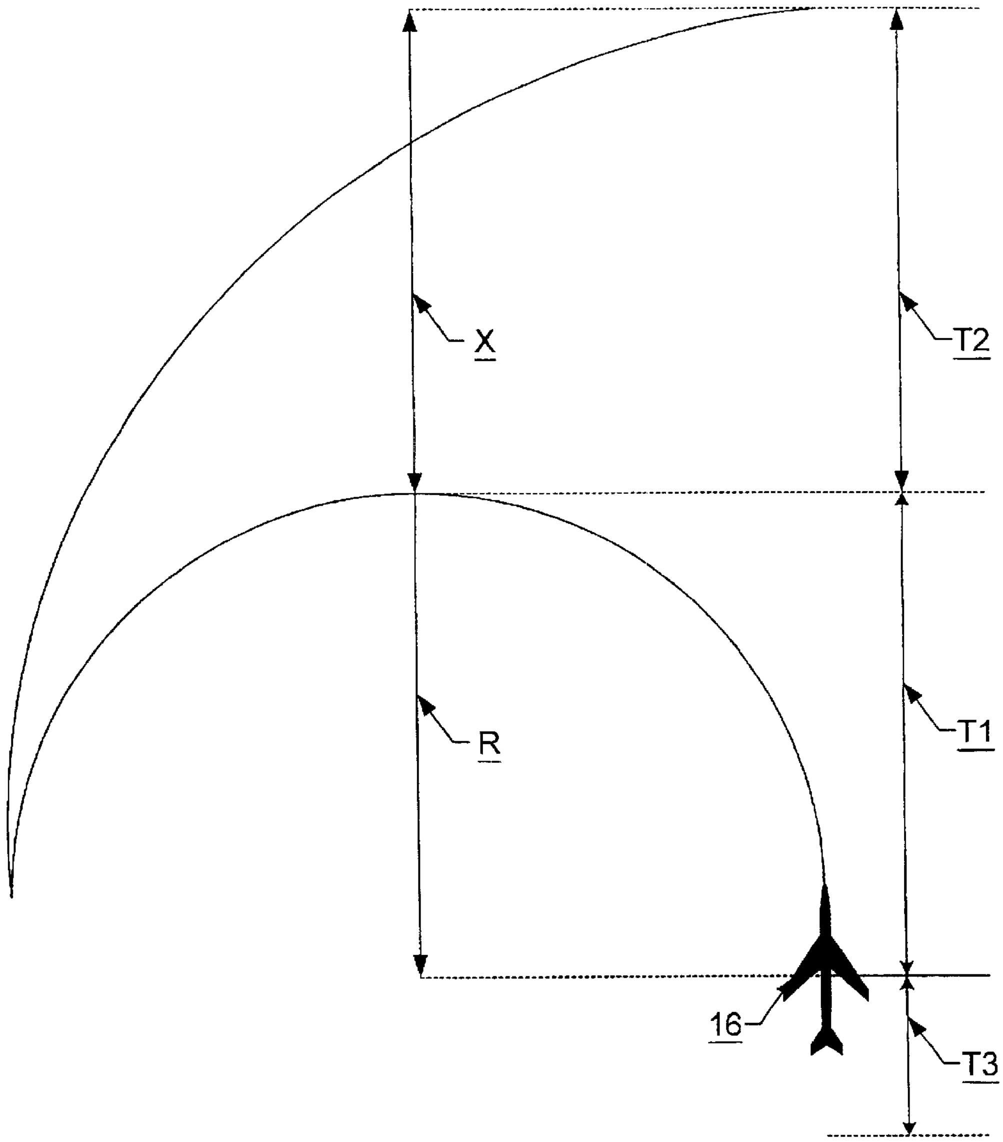
FIG. 9 is a top view illustrating graphically the turning radius and reaction time of an aircraft.

Specifically, FIG. 9 illustrates an aircraft 16, an aircraft turning radius R, either actual or assumed, and various turning and reaction times T1–T3. As discussed, the ground speed look ahead distance is based on an assumed turning radius R, while the roll angle look ahead distance is based on the actual turning radius R of the aircraft. The determination of the ground speed and roll angle look ahead distance values is based on the equation for the turning radius R. The turning radius R is proportional to the square of the ground speed and inversely proportional to the bank angle (Roll):

$$R=Vg^2/(G\times\tan(\text{roll})). \quad \text{Eq.(1)}$$

The equation for R is used to determine the equations for both look ahead distance values.

As examples, in one embodiment, the ground speed look ahead distance value is based on two assumed turning radii of the aircraft at a bank angle of 30° with an added 10 seconds of reaction time. As shown in FIG. 9, the ground speed look ahead distance, in this embodiment, is equal to the sum of a look ahead time T1 for a single turning radius R; a look ahead time T2 for a terrain clearance; and a predetermined reaction time T3. The terrain clearance T2 is provided to prevent inadvertent terrain contact as a result of the turn. The terrain clearance may be a fixed distance X or it may be equal to the turning radius R of the aircraft.

As shown in FIG. 7, in one embodiment the ground speed look ahead distance value is based on the equation 82:

$$LAD_{Ground\ Speed}=0.00278(Vg)+0.000050568(Vg^2)+K$$

where

LAD=ground speed look ahead distance in nm,

Vg=ground speed in kts, and

K=constant.

The derivation of this equation is discussed in detail in U.S. Pat. No. 5,839,080 to Muller and is also provided below.

Specifically, the turning radius R is proportional to the square of the ground speed and inversely proportional to the bank angle (Roll):

$$R=Vg^2/(G\times\tan(\text{Roll})) \quad \text{Eq.(1)}$$

where

R=turning radius in nm,

Vg=ground speed in kts,

G=speed of gravity, and

Roll=assumed roll angle of aircraft.

For a bank angle of 30°, the turning radius R in nautical miles (nm) as a function of speed in kts is:

$$G=32.1741\ \text{ft/sec}^2 \text{ or } 68624.496\ \text{nm/h}^2$$

$$\tan(30°)=\pi/6=0.57735$$

$$R=0.000025284(Vg^2) \quad \text{Eq.(2)}$$

The look ahead time T1 for a single turning radius is:

$$T1=R/Vg \quad \text{Eq.(3)}$$

Substituting for R from equation (1) in equation (3), T1 for a single turn radius is:

$$\begin{aligned} T1 &= Vg/(G\times\tan(Roll)) \quad \text{Eq. (4)}\\ &= 0.000025284(Vg) \end{aligned}$$

By assuming that the fixed clearance X, (see FIG. 9), is equal to one turning radius R, the total look ahead time for two turn radii, (i.e., T1+T2), is twice the time T1 for a single turning radius. Thus, the total look ahead time is 2(T1) plus a predetermined reaction time T3.

$$T(\text{Total})=2(T1)+T3 \quad \text{Eq.(5)}$$

The reaction time T3 of 10 seconds is equal to:

$$\begin{aligned} T3 &= 10\ \text{sec}\times(1\ \text{kts}) \quad \text{Eq. (6)}\\ &= 10\ \text{sec}\times(1\ \text{nm/h})\\ &= 10\ \text{sec}\times(1/3600\ \text{nm/sec})\\ &= 0.00278 \end{aligned}$$

As such, the total look ahead time is:

$$\begin{aligned} T(\text{Total}) &= 2(T1)+T3 \quad \text{Eq. (7)}\\ &= 2(0.000025284)Vg+0.00278. \end{aligned}$$

The ground speed look ahead distance value is determined by multiplying the total time T(Total) of equation (7) by the speed of the aircraft:

$$LAD_{Ground\ Speed}=Vg\times T(\text{Total})$$

or $$LAD_{Ground\ Speed}=0.000050568(Vg^2)+0.00278(Vg)+K$$

A constant K is added to the equation, which is typically 0.

As opposed to the ground speed look ahead distance, which is based on a theoretical turning radius of the aircraft, the roll angle look ahead distance is based on the actual roll angle of the aircraft and a predetermined reaction time. Specifically, as shown in FIG. 9, the roll angle look ahead distance is equal to the sum of a look ahead time T1 for the actual roll of the aircraft at radius R and a predetermined reaction time T3. For example, in one embodiment of the present invention, the roll look ahead distance is based on the actual roll angle of the aircraft and a reaction time of 5 seconds.

As shown in FIG. 7, in this embodiment the roll angle look ahead distance value is based on the equation 94:

$$LAD_{Roll\ Angle}=(Vg^2(0.000014598)/\tan(\text{ROLL}))+Vg(0.0013307)+K$$

where

LAD=ground speed look ahead distance in nm,

Vg=ground speed in kts,

K=constant, and

ROLL=actual roll angle of the aircraft.

The derivation of this equation is as follows.

Specifically, as stated previously, the turning radius R is proportional to the square of the ground speed and inversely proportional to the bank angle (Roll):

$$R=Vg^2/(G\times\tan(Roll)) \quad \text{Eq.(1)}$$

where

R=turning radius in nm,

Vg=ground speed in kts,

G=speed of gravity, and

Roll=roll angle of aircraft.

In the determination of the roll angle look ahead distance, the actual roll angle of the aircraft is used. As such, the roll angle in the equation (1) is the actual roll angle of the aircraft. For the given roll angle of the aircraft, the turning radius R in nautical miles (nm) as a function of speed in kts is for:

$$G=32.1741\ \text{ft/sec}^2 \text{ or } 68624.496\ \text{nm/h}^2$$

$$R=(0.000014598(Vg^2))/\tan(\text{Roll}) \qquad \text{Eq.(8)}$$

The look ahead time T1 for the actual roll angle of the aircraft is:

$$T1=R/Vg \qquad \text{Eq.(3)}$$

Substituting for R from equation (8) in equation (3), T1 for a single turn radius is:

$$T1=(0.000014598(Vg))/\tan(\text{Roll}) \qquad \text{Eq.(9)}$$

The reaction time T3 of 5 seconds is equal to:

$$\begin{aligned} T3 &= 5\ \text{sec} \times (1\ \text{kts}) \\ &= 5\ \text{sec} \times (1\ \text{nm/h}) \\ &= 5\ \text{sec} \times (1/3600\ \text{nm/sec}) \\ &= 0.0013307 \end{aligned}$$

As such, the total look ahead time is:

$$\begin{aligned} T(\text{Total}) &= T1 + T3 \\ &= ((0.000014598)Vg)/\tan(Roll) + 0.0013307. \end{aligned} \qquad \text{Eq. (10)}$$

The roll angle look ahead distance value is determined by multiplying the total time T(Total) of equation (10) by the speed of the aircraft:

$$LAD_{Roll\ Angle}=Vg\times T(\text{Total})$$

or $$LAD_{Roll\ Angle}=((0.000014598)Vg^2)/\tan(\text{Roll})+0.0013307(Vg)+K$$

A constant K is added to the equation, which is typically 0.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus for determining a corrected distance between an aircraft and a selected runway based on an altitude and distance of the aircraft from the selected runway, wherein said apparatus comprises a processor that compares a coordinate distance value representing a distance between the global coordinate values of the aircraft and the global coordinate values of the selected runway to a calculated distance value calculated based on the altitude of the aircraft above the runway and a predetermined glideslope, said predetermined glideslope based on predetermined operating parameters of the aircraft, and wherein said processor selects one of the coordinate distance value and the calculated distance value as the corrected distance between the aircraft and the selected runway based on a mathematical relationship between the coordinate and calculated distance values.

2. An apparatus according to claim 1, wherein said processor selects the larger of the coordinate distance value and the calculated distance value as the corrected distance between the aircraft and the selected runway.

3. An apparatus according to claim 1, wherein said processor receives an altitude of the aircraft and an elevation of the selected runway, and wherein said processor subtracts the altitude of the aircraft from the elevation of the runway to generate a value representing the altitude of the aircraft above the runway.

4. An apparatus according to claim 1, wherein the predetermined glideslope defines a predefined relationship between altitude and distance to the selected runway, such that said processor determines the calculated distance value to be equal to the distance to the selected runway associated with the altitude by the predefined relationship.

5. An apparatus according to claim 4, wherein the predefined glideslope defines a predefined relationship between altitude and distance to the selected runway expressed as:

$$X=(Y/\tan\theta)$$

where

θ=predetermined glideslope angle

Y=altitude above the runway

X=calculated distance value, wherein said processor determines the calculated distance value based on the predetermined glideslope angle and the altitude of the aircraft above the selected runway.

6. A method for determining a corrected distance between an aircraft and a selected runway based on an altitude and distance of the aircraft from the selected runway, wherein said method comprises the steps of:

comparing a coordinate distance value representing a distance between the global coordinate values of the aircraft and the global coordinate values of the selected runway to a calculated distance value calculated based on the altitude of the aircraft above the runway and a predetermined glideslope, said predetermined glideslope based on predetermined operating parameters of the aircraft; and selecting one of the coordinate distance and the calculated distance value as the corrected distance between the aircraft and the selected runway based on a mathematical relationship between the coordinate and calculated distance values.

7. A method according to claim 6, wherein said selecting step comprises selecting the larger of the coordinate distance value and the calculated distance value as the corrected distance between the aircraft and the selected runway.

8. A method according to claim 6 further comprising the steps of:

receiving an altitude of the aircraft and an elevation of the selected runway; and subtracting the altitude of the aircraft from the elevation of the runway to generate a value representing the altitude of the aircraft above the runway.

9. A method according to claim 6, wherein the predetermined glideslope defines a predefined relationship between altitude and distance to the selected runway, wherein said method further comprises determining the calculated distance value to be equal to the distance to the selected runway associated with the altitude by the predefined relationship.

10. A method according to claim 9, wherein the predefined glideslope defines a predefined relationship between altitude and distance to the selected runway expressed as:

$$X=(Y/\tan\theta)$$

where

θ is the predetermined glideslope angle

Y is the altitude above the runway

X is the calculated distance value, wherein said determining step comprises determining the calculated distance value based on the predetermined glideslope angle and the altitude of the aircraft above the selected runway.

11. A computer program product for determining a corrected distance between an aircraft and a selected runway based on an altitude and distance of the aircraft from the selected runway, wherein the computer program product comprises:

a computer readable storage medium having computer readable program code means embodied in said medium, said computer-readable program code means comprising:

first computer instruction means for comparing a coordinate distance value representing a distance between the global coordinate values of the aircraft and the global coordinate values of the selected runway to a calculated distance value calculated based on the altitude of the aircraft above the runway and a predetermined glideslope, said predetermined glideslope based on predetermined operating parameters of the aircraft; and second computer instruction means for selecting one of the coordinate distance and the calculated distance value as the corrected distance between the aircraft and the selected runway based on a mathematical relationship between the coordinate and calculated distance values.

12. A computer program product as defined in claim 11, wherein said second computer instruction means comprises means for selecting the larger of the coordinate distance and the calculated distance value as the corrected distance between the aircraft and the selected runway.

13. A computer program product as defined in claim 11, wherein said computer-readable program code means further comprises:

third computer instruction means for receiving an altitude of the aircraft and an elevation of the selected runway; and fourth computer instruction means for subtracting the altitude of the aircraft from the elevation of the runway to generate a value representing the altitude of the aircraft above the runway.

14. A computer program product as defined in claim 11, wherein the predetermined glideslope defines a predefined relationship between altitude and distance to the selected runway, wherein said computer-readable program code means further comprises fifth computer instruction means for determining the calculated distance value to be equal to the distance to the selected runway associated with the altitude by the predefined relationship.

15. A computer program product as defined in claim 14, wherein the predefined glideslope defines a predefined relationship between altitude and distance to the selected runway expressed as:

$$X=(Y/\tan\theta)$$

where

θ is the predetermined glideslope angle

Y is the altitude above the runway

X is the calculated distance value, wherein said fifth computer instruction means comprises means for determining the calculated distance value based on the predetermined glideslope angle and the altitude of the aircraft above the selected runway.

16. An apparatus for determining a corrected distance between an aircraft and a selected runway based on the position of the aircraft with respect to an envelope constructed about the selected runway representing a predetermined glideslope, said predetermined glideslope angle based on predetermined operating parameters of the aircraft, wherein said apparatus comprises a processor for selecting a coordinate distance value representing a distance between the global coordinate values of the aircraft and the global coordinate values of the selected runway if the aircraft is within the envelope and for selecting a calculated distance value calculated based on the altitude of the aircraft above the runway and the predetermined glideslope if the aircraft is positioned outside the envelope.

17. An apparatus according to claim 16, wherein said processor selects one of the coordinate distance and the calculated distance value as the corrected distance between the aircraft and the selected runway based on a mathematical relationship between the coordinate and calculated distance values.

18. An apparatus according to claim 17, wherein said processor selects the larger of the coordinate distance and the calculated distance value as the corrected distance between the aircraft and the selected runway.

19. An apparatus according to claim 16, wherein said processor receives an altitude of the aircraft and an elevation of the selected runway, and wherein said processor subtracts the altitude of the aircraft from the elevation of the runway to generate a value representing the altitude of the aircraft above the runway.

20. An apparatus according to claim 16, wherein the predetermined glideslope defines a predefined relationship between altitude and distance to the selected runway, such that said processor determines the calculated distance value to be equal to the distance to the selected runway associated with the altitude by the predefined relationship.

21. An apparatus according to claim 20, wherein the predefined glideslope defines a predefined relationship between altitude and distance to the selected runway expressed as:

$$X=(Y/\tan\theta)$$

where

θ=predetermined glideslope angle

Y=altitude above the runway

X=calculated distance value, wherein said processor determines the calculated distance value based on the predetermined glideslope angle and the altitude of the aircraft above the selected runway.

22. An apparatus according to claim 16, wherein after said processor determines a corrected distance between an aircraft and a selected runway, said processor determines a look ahead distance value for use in a ground proximity warning system by comparing the corrected distance value to a ground speed look ahead distance value based upon the ground speed of the aircraft and the turning radius of the aircraft and a roll angle look ahead distance value based upon the roll angle of the aircraft and turning radius of the aircraft.

23. An apparatus according to claim 22, wherein said processor selects one of the calculated distance value, ground speed look ahead distance value, and the roll angle look ahead distance value as the look ahead distance value based on a mathematical relationship between the calculated distance value, ground speed look ahead distance value, and the roll angle look ahead distance value.

24. An apparatus according to claim 23, wherein said processor selects the smaller of the calculated distance value, ground speed look ahead distance value, and the roll angle look ahead distance value as the look ahead distance value.

* * * * *